United States Patent [19]
Kahr

[11] Patent Number: 5,595,267
[45] Date of Patent: Jan. 21, 1997

[54] BRAKE SHOE HAVING FATIGUE RESISTANT BACKING PLATE

[75] Inventor: Joseph C. Kahr, Southern Pines, N.C.

[73] Assignee: Westinghouse Air Brake Company, Wilmerding, Pa.

[21] Appl. No.: 661,820

[22] Filed: Jun. 11, 1996

Related U.S. Application Data

[63] Continuation-in-part of Ser. No. 625,179, Mar. 29, 1996.
[51] Int. Cl.$^6$ ....................................................... I16D 69/00
[52] U.S. Cl. ................ 188/261; 188/250 D; 188/250 B
[58] Field of Search .............................. 188/29, 57, 73.1, 188/73.31, 238–242, 250 B, 250 D, 250 E, 250 G, 250 R, 252, 253, 258, 261, 264 G

[56] References Cited

U.S. PATENT DOCUMENTS

| | | | |
|---|---|---|---|
| 1,175,255 | 3/1916 | Gallagher | 188/241 |
| 2,885,037 | 5/1959 | Wilson | 188/247 |
| 5,117,949 | 6/1992 | Buckley et al. | 188/73.31 |
| 5,341,904 | 8/1994 | Christie | 188/250 B |

FOREIGN PATENT DOCUMENTS 698305  11/1965  Italy .................................. 188/250 D Primary Examiner—Robert J. Oberleitner
Assistant Examiner—Chris Schwartz
Attorney, Agent, or Firm—Gary J. Falce

[57] ABSTRACT

A composition type brake shoe for a railroad car in which the backing plate keybridge is filled with composition brake lining material to reinforce the keybridge. A recess formed in the braking face of the brake lining extends beyond the keybridge so that a relatively thin area of brake lining is formed between the recess and backing plate outboard of the keybridge opening, and to which thin section area cracks that may develop in the brake lining are encouraged to migrate in order to redirect backing plate flexure away from the critical keybridge area to a stronger area of the backing plate.

3 Claims, 1 Drawing Sheet

BRAKE SHOE HAVING FATIGUE RESISTANT BACKING PLATE

REFERENCE TO RELATED APPLICATION

This is a continuation-in-part application of U.S. application, Ser. No. 08/625,179, filed Mar. 29, 1996, by the same inventor and having the same title as in the present application.

BACKGROUND OF THE INVENTION

The present invention relates to brake shoes for railroad cars and particularly to composition lined brake shoes having a metal backing plate to which the composition brake shoe material is bonded.

Brake shoes of the aforementioned type typically incorporate a projecting structure of the backing plate known as a key bridge for insertion into a complementary pocket in a brake head or brake shoe carrier via which a locking key is passed to firmly secure the brake shoe to the brake head under spring tension of the locking key. Depending upon the particular style of manufacture, the brake lining of these brake shoes may be continuous over the entire braking face or alternatively, may be discontinuous. In the latter case, the discontinuity in the braking face may be manifested by a recess formed in the braking face substantially adjacent the keybridge concavity that only extends partially into the composition brake lining, or by a two-piece lining that results from the recess extending completely through the brake lining into the keybridge concavity.

Collapse and breakage of the backing plate in the critical area of the keybridge is possible in these various style brake shoes. Vibration and impacts that occur in service between the brake shoe and brake head due to irregular track and/or damaged wheel treads cause excessive brake head wear at the interface with a brake shoe. As this brake head wear increases, flexure of the brake shoe backing plate can occur during application of the brakes. In time, collapse and breakage of the backing plate occurs in the area of the key holes in the keybridge as a result of this flexure. Breakage of the backing plate in this area is considered critical since a portion of the brake shoe is free to fall off of the brake head. This not only reduces the brake effectiveness, but if the remaining part of the brake shoe is not replaced soon after the breakage, contact between the wheel and brake head during brake applications could damage these parts.

In the case of a brake shoe having a two-piece lining, it is quite evident that without any brake lining support at the mouth of the keybridge, flexure can occur at the keybridge with consequent breakage, as discussed.

Even brake shoes having a one-piece brake lining that extends intact across the mouth of the keybridge are susceptible to backing plate failure at the keyhole area of the keybridge under conditions of severe vibration and impact forces between the brake head and brake shoe. Moreover, brake shoes having the keybridge concavity filled with composition brake lining material to reinforce the keybridge, as disclosed in the referencing application, are not entirely free of failure, since any cracks that develop in the brake lining adjacent the keybridge can easily migrate to the area of maximum flexure, i.e., the keyhole area of the keybridge. This in effect degrades the integrity of the keybridge reinforcement brought about by filling the keybridge with composition brake material, and allows keybridge flexure and consequent fatigue fracture to occur at the keyhole area.

SUMMARY OF THE INVENTION

Therefore, the object of the invention is to reduce the incidence of backing plate failure by reducing backing plate flexure at the keybridge and re-directing such flexure to an area of the backing plate beyond the keybridge where maximum resistance to fatigue fracture exists due to the absence of keyholes or other discontinuities.

In accordance with the present invention, there is provided a composition type brake shoe including a continuous metal backing plate to which a one-piece composition brake lining may be bonded. The backing plate is formed with an upraised keybridge having keyholes to receive a locking key for affixing the brake shoe to a brake head. The concavity of the keybridge is filled with the composition brake lining material except for a keyway through which the locking key is inserted, in order to reinforce the keybridge against flexure due to vibrations and impact forces, particularly under worn brake head conditions. The braking face of the brake lining is formed with a laterally extending recess adjacent the keybridge by which means there is formed between the base of the recess and the backing plate a relatively thin section of composition brake lining material that lies beyond the keybridge concavity on each side thereof and via which cracks that may develop in the brake lining are encouraged to migrate to the backing plate in order to re-direct backing plate flexure away from the keybridge.

BRIEF DESCRIPTION OF THE DRAWINGS

This object and other objects and advantages of the invention will become apparent from the following more detailed explanation when taken in conjunction with the accompanying drawings in which.

DESCRIPTION AND OPERATION

Figure 1:
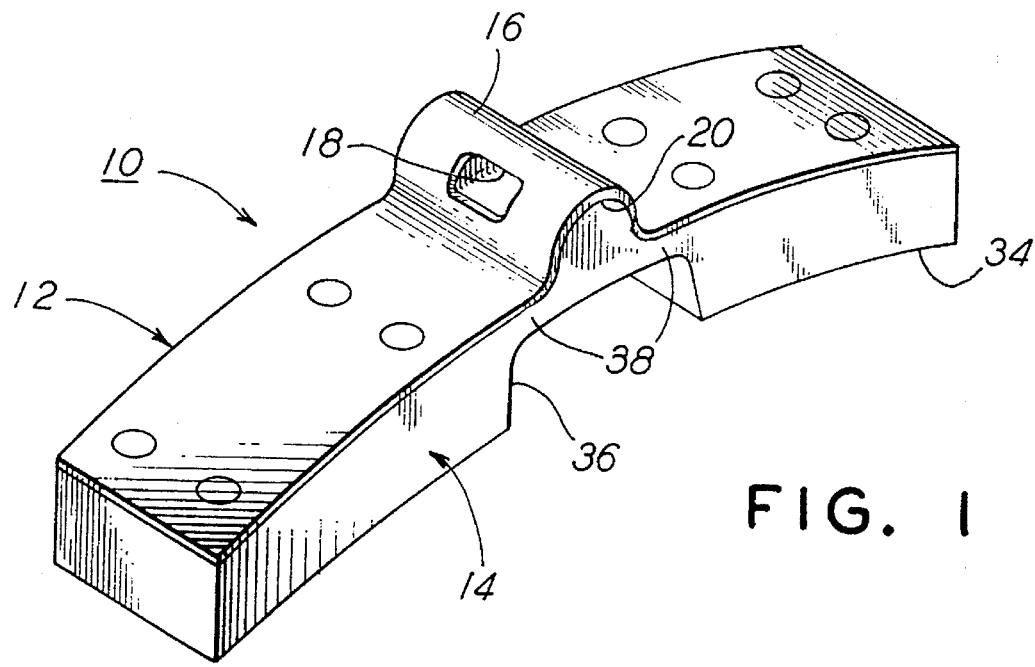
FIG. 1 is an axonometric view of a composition type brake shoe showing the keybridge concavity filled with composition brake lining material and the face of the brake lining formed with a recess in accordance with the present invention.
Figure 2:
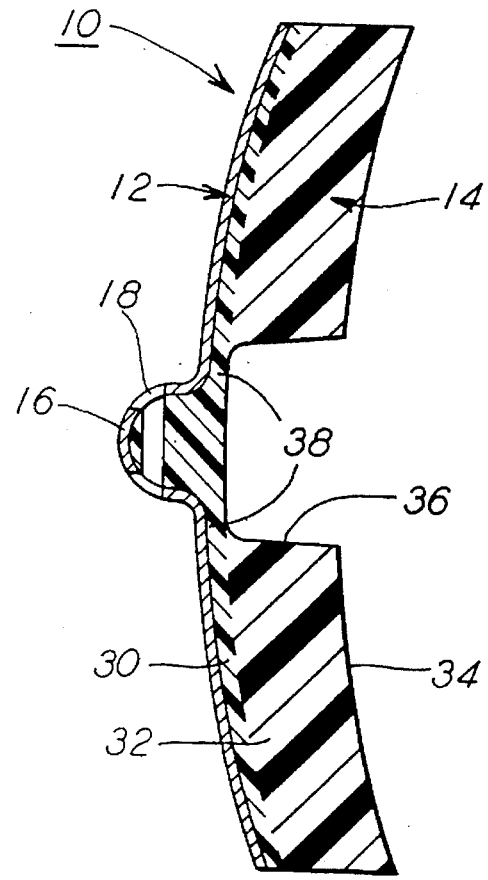
FIG. 2 is a section view of the brake shoe of FIG. 1 showing the brake shoe recess and a thin section of brake lining formed by the recess on opposite sides of the keybridge adjacent an area of the backing plate beyond the keybridge that is free of discontinuities.

As shown in FIGS. 1 and 2 a brake shoe device 10 comprises a unitary metal backing plate 12 to an under surface of which is bonded a composition brake lining 14. Backing plate 12 has a constant thickness and is formed at its midsection with a generally U-shaped, integral key bridge 16 that projects from the opposite upper surface of the backing plate 12. Keybridge 16 is adapted to be received in a complementary opening in a brake head (not shown) to which the brake shoe may be secured by a spring-type locking key (also not shown). Each side of the U-shaped keybridge has an opening or keyhole 18 through which such locking key is passed when the keybridge is properly positioned in a brake head to secure the brake shoe to the brake head under spring tension of the locking key.

Within the underside of keybridge 16 is formed a concavity 20 that extends the entire width of the backing plate and is open at the lateral ends thereof. In accordance with the present invention, concavity 20 is filled with a composition brake material during the molding process of bonding a brake lining 14 to the backing plate. In the molding of composition type brake shoes, a composition binder material 30 may be employed adjacent metal backing plate 12, such binder material being known to have excellent impact resistance, as well as a high strength bonding characteristic. Such binder material is used in conjunction with the friction lining composition material 32 which forms a braking face 34 that is adapted to frictionally engage the tread of a railway car wheel (not shown). While application of the binder composition material in conjunction with the friction composition material is preferred, it is not intended that the present invention be limited to such combination, since friction composition material itself may have sufficient bonding characteristics as to be suitable in the application of the present invention without the binder.

In order to form a keyway through the composition lining material in concavity 20, a core may be inserted in the mold and subsequently removed following the curing period of the molded brake shoe. Alternatively, the concavity may be filled without employing such a core in the mold, in which case the keyhole may be formed by drilling an appropriate keyhole through the filled concavity after the composition material has cured. In either case, the composition filled concavity 20 makes keybridge 16 less prone to flexure and thus more fatigue resistant than a keybridge that is absent or only partially filled with composition material, even without resorting to a metal reinforcing insert as disclosed in the co-pending referenced application.

The desideratum of keybridge reinforcement by filling the keybridge concavity with composition brake lining material is complemented by the present invention, which effectively prevents cracks that may develop in the brake lining from migrating to the backing plate via the filled keybridge concavity. In accordance with the present invention, brake shoe 10 is molded with a recess 36 in braking face 34. Preferably, recess 36 extends across the entire width of brake lining 30 in substantially juxtaposed relationship with concavity 20. The minimum width of this recess is greater than the corresponding maximum width of concavity 20, so that recess 36 encompasses an area 38 of brake lining 14 that extends longitudinally beyond the bounds of concavity 20. This area 38 of brake lining 30 encompassed by recess 36 is intended to be of such thin cross-section as to predispose brake lining 14 to crack in this area in the event such severe vibration and impact forces are encountered that could otherwise create cracks within concavity 20.

The cross-sectional dimension or thickness of this thin area 38 is determined by the depth of recess 36, such depth being limited only by the need to maintain free flow of the composition material during the process of molding the brake lining 30 and bonding the brake lining to backing plate 12. The optimum thickness of this thin section area 38 has been found to be between 17% and 24% of the maximum thickness of the braking lining between braking face 34 and backing plate 12.

It will now be appreciated that in providing thin cross-sectional areas 38 of brake lining 14 on opposing sides of keybridge concavity 20 having a thickness less than the thickness of brake lining 14 within the area of concavity 20, any such cracks that might develop in brake lining 14 will be encouraged to occur at thin cross-sectional areas 38, as opposed to occurring within concavity 20. In this manner, the integrity of the reinforcing composition brake lining material bonded to backing plate 12 within concavity 20 is assured, thereby continuing to strengthen keybridge 16 against such flexure as could otherwise result in backing plate fracture at the keyhole area of the keybridge.

By encouraging any cracks that might occur in brake lining 14 to migrate from the braking face 34 to backing plate 12 via thin section areas 38, it will be understood that flexure of backing plate 12 is re-directed to the area of backing plate 12 that is absent any discontinuities, such as the keyholes in keybridge 16. Accordingly, backing plate 12 is better able to withstand such flexure as would otherwise cause fatigue failure at keybridge 16 in the absence of the present invention. In thus establishing the location where cracks can develop in the brake lining, such that consequent backing plate flexure occurs in a specific location of the backing plate, brake shoe efficiency is improved and brake shoe service life is considerably extended.

I claim:

1. A brake shoe for braking engagement with the tread of railroad car wheel comprising:
    a) a backing plate formed intermediate the ends thereof with a keybridge that projects from one surface of said backing plate and provides a concavity in a surface of said backing plate opposite said one surface, said concavity extending the entire width of said backing plate;
    b) a brake lining comprised of a composition material bonded to said opposite surface of said backing plate and to said keybridge within the area of said concavity so as to substantially fill said concavity, said brake lining having a braking face with which said brake shoe establishes braking engagement with said railroad car wheel tread; and
    c) a recess in said braking face extending across the entire width thereof, said recess being in substantially juxtaposed relationship with said concavity and having a minimum width that is greater than the maximum dimension of said concavity in the longitudinal direction of said brake shoe such that the thickness of said brake lining is least in an area thereof between said recess and said backing plate beyond the bounds of said concavity delineating said maximum width thereof.

2. A brake shoe as recited in claim 1, wherein the depth of said recess is such that said thickness of said area of said brake lining having said least thickness is between 17% and 24% of the maximum thickness of said brake lining.

3. A brake shoe as recited in claim 1, wherein said backing plate including said keybridge is formed from a unitary metal plate having generally the same thickness throughout.

* * * * *